United States Patent
Hunzeker

(10) Patent No.: US 9,723,865 B2
(45) Date of Patent: Aug. 8, 2017

(54) METHOD AND APPARATUS FOR OIL REMOVAL FROM FOOD SURFACE

(71) Applicant: General Mills, Inc., Minneapolis, MN (US)

(72) Inventor: Dan Hunzeker, Hannibal, MO (US)

(73) Assignee: General Mills, Inc., Minneapolis, MN (US)

(*) Notice: Subject to any disclaimer, the term of this patent is extended or adjusted under 35 U.S.C. 154(b) by 0 days.

(21) Appl. No.: 15/032,973

(22) PCT Filed: Nov. 1, 2013

(86) PCT No.: PCT/US2013/067923
§ 371 (c)(1),
(2) Date: Apr. 28, 2016

(87) PCT Pub. No.: WO2015/065465
PCT Pub. Date: May 7, 2015

(65) Prior Publication Data
US 2016/0249648 A1    Sep. 1, 2016

(51) Int. Cl.
| | |
|---|---|
| A01J 25/11 | (2006.01) |
| A23L 5/30 | (2016.01) |
| A23L 7/13 | (2016.01) |
| A23L 19/18 | (2016.01) |
| A23L 33/20 | (2016.01) |
| A23L 1/015 | (2006.01) |
| A23L 1/164 | (2006.01) |
| A23L 1/217 | (2006.01) |

(52) U.S. Cl.
CPC ............... *A23L 5/30* (2016.08); *A23L 1/015* (2013.01); *A23L 1/1645* (2013.01); *A23L 1/217* (2013.01); *A23L 7/13* (2016.08); *A23L 19/18* (2016.08); *A23L 33/20* (2016.08); *A23V 2002/00* (2013.01)

(58) Field of Classification Search
CPC .......... A23L 1/015; A23L 1/107; A23L 1/217; A23L 1/1645; A23L 5/30; A23L 7/13; A23L 19/18; A23L 33/20; A23V 2002/00
See application file for complete search history.

(56) References Cited

U.S. PATENT DOCUMENTS

| | | | | | |
|---|---|---|---|---|---|
| 3,244,535 | A | * | 4/1966 | Lauck | A23C 19/082 426/321 |
| 3,627,535 | A | * | 12/1971 | Davidson | A23L 1/217 426/441 |
| 3,690,895 | A | * | 9/1972 | Amadon | A23L 1/2175 426/439 |
| 4,269,861 | A | * | 5/1981 | Caridis | A47J 37/1214 426/438 |
| 4,537,786 | A | * | 8/1985 | Bernard | A23L 1/217 426/438 |
| 4,816,274 | A | * | 3/1989 | Baisden | A23L 1/0107 426/417 |

(Continued)

FOREIGN PATENT DOCUMENTS

| | | | |
|---|---|---|---|
| EP | 0943275 | * | 9/1999 |
| WO | WO 2008/103056 | | 8/2008 |

*Primary Examiner* — Anthony Weier
(74) *Attorney, Agent, or Firm* — Diederiks & Whitelaw, PLC; John L. Crimmins, Esq.; Annette M. Frawley, Esq.

(57) ABSTRACT

A method and apparatus for oil removal from food surfaces is shown. An air flow chamber directs air flow around a food product surface and contains the removed oil.

20 Claims, 4 Drawing Sheets

(56) References Cited

U.S. PATENT DOCUMENTS

| | | | |
|---|---|---|---|
| 5,312,635 A * | 5/1994 | Kazlas | A23L 1/0152 |
| | | | 426/417 |
| 5,690,018 A | 11/1997 | Hansen | |
| 7,560,128 B2 * | 7/2009 | Sloan | A23L 1/217 |
| | | | 426/250 |
| 7,794,765 B2 | 9/2010 | Maguire | |
| 8,558,142 B2 | 10/2013 | Theodos et al. | |
| 8,715,760 B2 | 5/2014 | Ashourian et al. | |
| 8,808,779 B2 * | 8/2014 | Desai | A23L 1/217 |
| | | | 426/438 |
| 9,521,857 B2 | 12/2016 | Spurr et al. | |
| 2006/0083831 A1 * | 4/2006 | Caridis | A23L 1/0073 |
| | | | 426/438 |
| 2006/0147587 A1 * | 7/2006 | Kovich | A21C 15/025 |
| | | | 426/138 |
| 2008/0220144 A1 | 9/2008 | Richards | |
| 2008/0237104 A1 | 10/2008 | Foster et al. | |
| 2012/0012011 A1 | 1/2012 | Millikin et al. | |
| 2013/0180413 A1 * | 7/2013 | Tjerkgaast | A47J 37/0641 |
| | | | 99/447 |

* cited by examiner

METHOD AND APPARATUS FOR OIL REMOVAL FROM FOOD SURFACE

CROSS-REFERENCE TO RELATED APPLICATIONS

The present application represents a National Stage application of PCT/US2013/067923 entitled "Oil Removal From Food Surface" filed Nov. 1, 2013, pending.

BACKGROUND

When food products are cooked in hot oil, a substantial amount of oil adheres to the product surface after being removed from the hot cooking oil bath. This residue oil will either drip off the food surface or be absorbed into the food product surface the as it is transported to the next processing step for the just fried food product. Controlling the removal and capture of this residue oil is a challenge.

SUMMARY

The present disclosure relates to oil removal from food surfaces, in particular the present disclosure relates to the controlled removal of oil food surfaces and controlled capture of this oil.

In one illustrative embodiment, a method of removing oil from a food surface includes placing a food article within an air flow chamber. The air flow chamber has an inlet air expansion zone and an opposing outlet air contraction zone and the food article is within a product zone separating the inlet air expansion zone and the opposing outlet air contraction zone. Air flows from the inlet air expansion zone to the opposing outlet air contraction zone to form an air flow. The product zone has a pressure that is less than or equal to an ambient pressure outside the air flow chamber. Oil is removed from the food surface with the air flow.

In another illustrative embodiment, an apparatus for removing oil from a food surface includes an air flow chamber and a food product conveyor for moving food product through the product zone in a direction orthogonal to an air flow direction in the air flow chamber. The air flow chamber has an inlet air expansion zone and an opposing outlet air contraction zone and a product zone separating the inlet air expansion zone and the opposing outlet air contraction zone. The air flow chamber is configured to provide laminar air flow within the product zone.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

Figure 1:
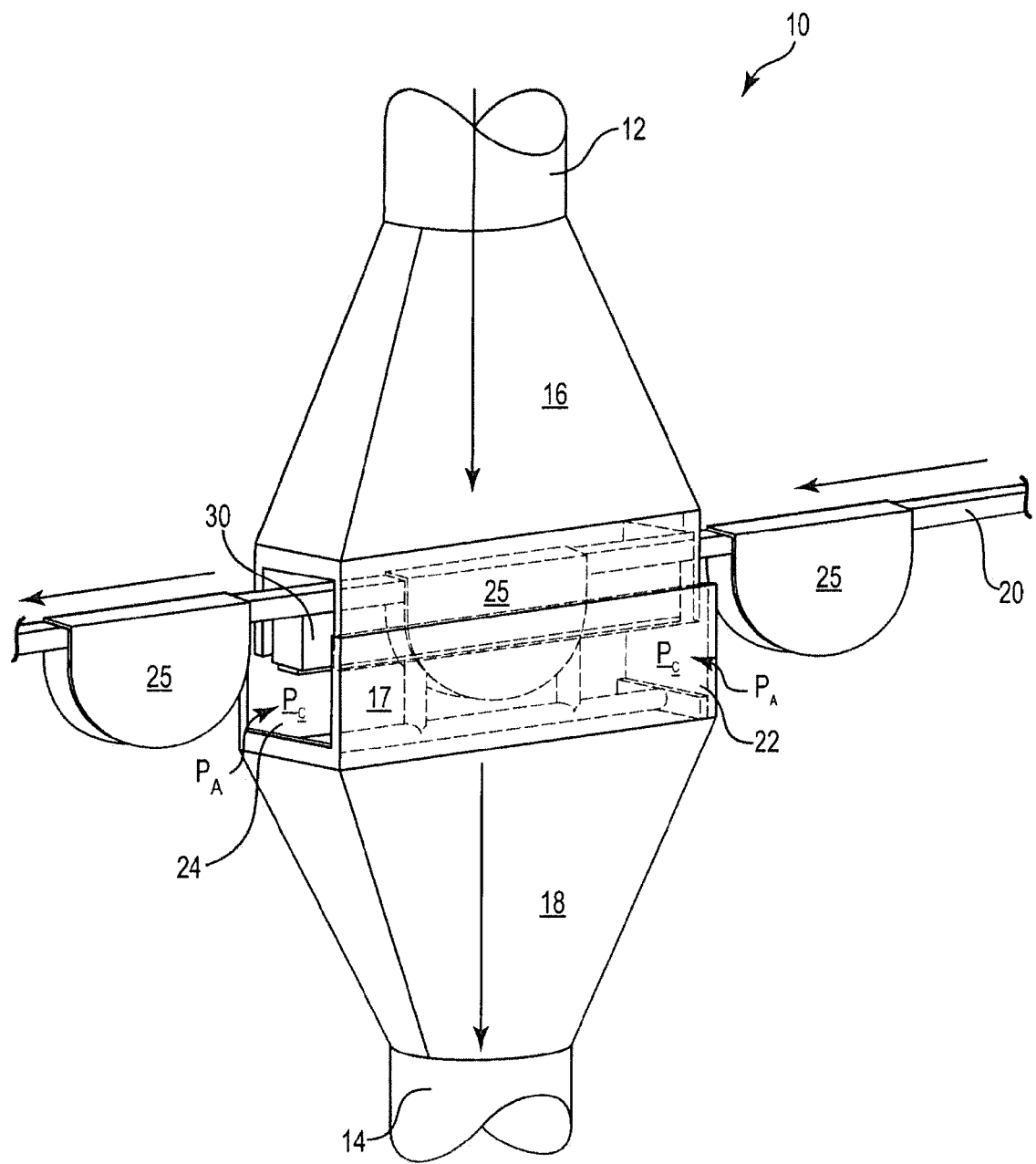
FIG. 1 is a perspective side view of an illustrative air flow chamber for oil removal from food surfaces.

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

The phrase "laminar air flow" refers to air (or fluid) flowing in parallel layers, without disruption between the layers. Laminar flow in a pipe is usually defined as having a Reynolds number of 2300 or less or 2000 or less.

The terms "upstream" and "downstream" refer to relative positions of elements of the flow chamber described in relation to the direction of air flow as it is drawn from the air chamber inlet and through the product zone to the air chamber outlet.

The present disclosure relates to oil removal from food surfaces, in particular the present disclosure relates to the controlled removal of oil food surfaces and controlled capture of this oil. An air flow chamber has an inlet air expansion zone and an opposing outlet air contraction zone and the food article is within a product zone separating the inlet air expansion zone and the opposing outlet air contraction zone. Air flows from the inlet air expansion zone to the opposing outlet air contraction zone to form an air flow. The product zone has a pressure that is less than or equal to an ambient pressure outside the air flow chamber. Oil is removed from the food surface with the air flow. The amount of turbulence, or lack thereof, of the air flow incident on the food product can be determined to increase or decrease the rate of residue oil removal from the food product surface. In many embodiments the air flow incident on the food product surface is laminar air flow. Laminar air flow has been found to increase the rate of residue oil removal from the food product surface. In some embodiments, air flow diverter elements can modify the air flow incident on specific food surfaces so that an amount of oil removal can be differential along the food product surface. While the present disclosure is not so limited, an appreciation of various aspects of the disclosure will be gained through a discussion of the examples provided below.

Figure 2:
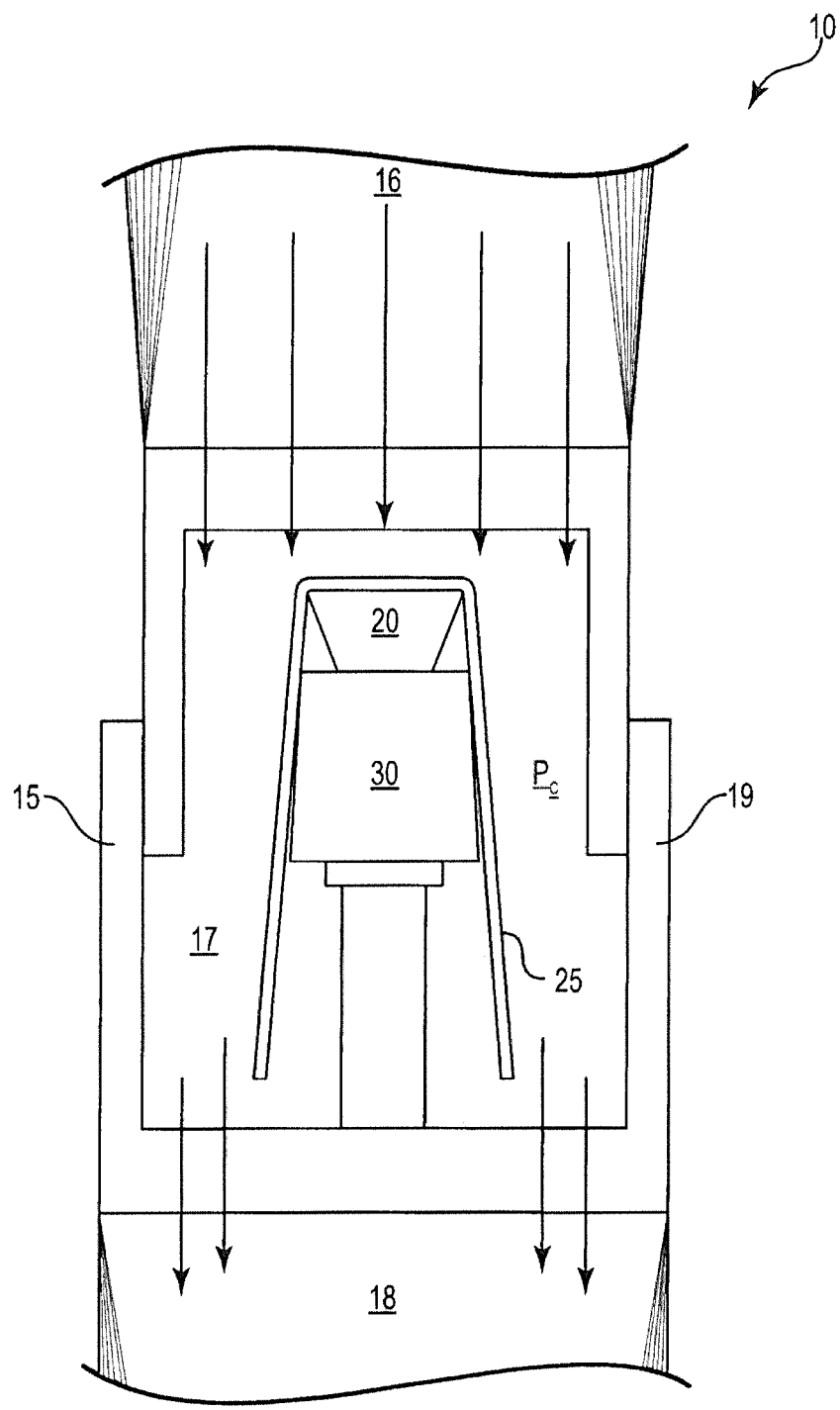
FIG. 2 is a cross-sectional view of the illustrative air flow chamber of FIG. 1.

FIG. 1 is a perspective side view of an illustrative air flow chamber 10 for oil removal from food surfaces 25. FIG. 2 is a cross-sectional view of the illustrative air flow chamber 10 of FIG. 1. A substantial amount of the residue oil on the food product surface is removed or selectively removed as the food product is transported through the air flow chamber 10. This removed residue oil is thus contained and collected within the apparatus for oil removal from food surfaces.

The apparatus for oil removal from food surfaces includes an air flow chamber 10 disposed between an air inlet 12 and an opposing air outlet 14. The air flow chamber 10 includes an inlet air expansion zone 16 and an opposing outlet air contraction zone 18 and a product zone 17 separating the inlet air expansion zone 16 and the opposing outlet air contraction zone 18. The air flow chamber 10 is configured to provide a specified level of turbulent or laminar air flow within the product zone 17 (as illustrated by the directions of the arrows within the inlet air expansion zone 16 and an opposing outlet air contraction zone 18). A food product conveyor 20 is disposed through the air flow chamber 10. The food product conveyor 20 is disposed through the product zone 17. The food product conveyor 20 moves or conveys food product 25 through the product zone 17 in a direction orthogonal to an air flow direction (as illustrated by the directions of the arrows parallel with the food product conveyor 20).

The inlet air expansion zone 16 is bounded on all sides by suitable ducting material and directs and expands the air flow area from the air inlet 12 area to the product zone 17 area. In many embodiments this area expansion is a smooth transition from the air inlet 12 area to the product zone 17 area. In some embodiments the air inlet 12 area is a circular or oval cross-sectional shape and the product zone 17 area is a rectangular or extended oval cross-sectional shape.

The outlet air contraction zone 18 is bounded on all sides by suitable ducting material and directs and contracts the air flow area from the product zone 17 area to the air outlet 14 area. In many embodiments this area contracts is a smooth transition from the product zone 17 area to the air outlet 14 area. In some embodiments the air outlet 12 area is a circular or oval cross-sectional shape and the product zone 17 area is a rectangular or extended oval cross-sectional shape.

The product zone 17 is bounded on two sides by opposing side walls 15, 19 and opposing open ends 22, 24 that are perpendicular to the opposing side walls 15, 19. A food product conveyor 20 extends through the product zone 17 and out the open ends 22, 24. The product zone 17 area is a rectangular or extended oval cross-sectional shape.

In many embodiments, the air flow chamber 10 is configured to provide a specified laminar air flow within the product zone 17. Laminar air flow" refers to air (or fluid) flowing in parallel layers, without disruption between the layers. In some embodiments laminar flow refers to air flow without cross currents perpendicular to the direction of flow, nor eddies or swirls of fluids. In laminar flow the motion of the particles of fluid is very orderly with all particles moving in straight lines parallel to the air flow chamber walls. When a fluid (e.g., air) is flowing through a closed channel such as a pipe or between two flat plates, either of two types of flow may occur depending on the velocity of the fluid: laminar flow or turbulent flow. Laminar flow tends to occur at lower velocities, below the onset of turbulent flow. Turbulent flow is a less orderly flow regime that is characterized by eddies or small pockets of fluid particles which result in lateral mixing. In nonscientific terms laminar flow is "smooth", while turbulent flow is "rough". The dimensionless Reynolds number is an important parameter in the equations that describe whether flow conditions lead to laminar or turbulent flow. In the case of flow through a straight pipe with a circular cross-section, at a Reynolds number below the critical value of approximately 2300 fluid motion will ultimately be laminar, whereas at larger Reynolds number the flow can be turbulent. The Reynolds number delimiting laminar and turbulent flow depends on the particular flow geometry, and moreover, the transition from laminar flow to turbulence can be sensitive to disturbance levels and imperfections present in a given configuration. Whether flow within the air flow chamber duct will be laminar is dependent upon the Reynolds number associated with the system. The Reynolds number is derived from various parameters including the dimensions of the air flow chamber, the average velocity, and the viscosity and the density of the air in the air flow chamber. The conditions for laminar airflow are typically found with Reynolds numbers below 2300 or below 2000 or below 1000.

In many embodiments, the air flow chamber 10 includes a conveyor inlet opening 22 and a conveyor outlet opening 24. The conveyor inlet opening 22 and the conveyor outlet opening 24 can form opposing open sides or open ends defining two sides of the air flow chamber 10 and particularly defining two sides of the product zone 17. These openings 22 and 24 allow the food product conveyor 20 to move or convey food product 25 through the product zone 17.

In preferred embodiments, the air pressure $P_C$ in the product zone is equal to or less than ambient pressure $P_A$ outside the air flow chamber 10. Thus, air does not flow from the air flow chamber 10 into the ambient environment surrounding the air flow chamber 10. This pressure arrangement prevents oil laden air from being transmitted from the air flow chamber 10 into the ambient environment surrounding the air flow chamber 10. The oil laden air is contained within the oil removal system and can be removed from the system as described below. Specifically air can flow from the ambient environment and into the air flow chamber 10 via the conveyor inlet opening 22 and the conveyor outlet opening 24.

In many embodiments the air flow chamber 10 includes a vibrating element 30 that transmits vibration to the food product 25 to improve oil removal from the food product 25. The vibrating element 30 can be any useful vibrating element vibrating at any useful oil removal frequency such as, at least 10 hertz or at least 20 hertz. The vibrating element 30 can transmit vibration through the conveyor 20, or the vibrating element 30 can transmit vibration directly to the food product 25, or a combination of these.

Figure 3:
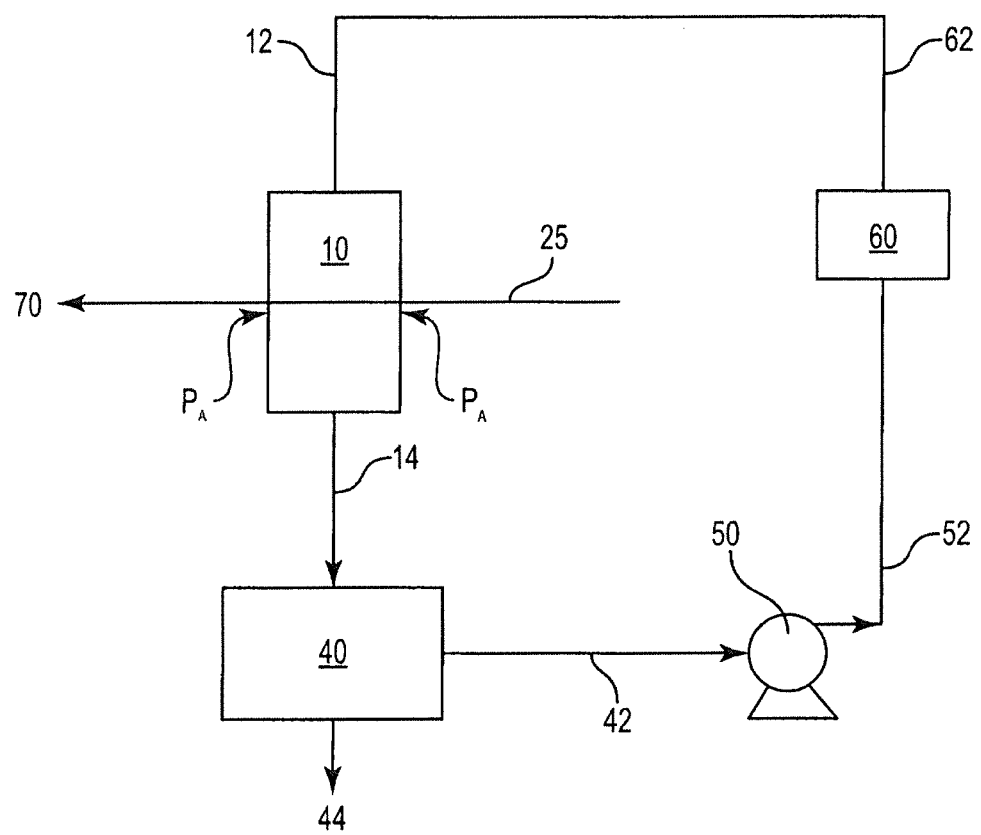
FIG. 3 is a schematic block flow diagram of an illustrative food product oil removal and containment system.

FIG. 3 is a schematic block flow diagram of an illustrative food product oil removal and containment system. The air outlet 14 is fluidly connected to the air inlet 12 forming a closed loop air flow system.

An air flow generator 50 (such as a blower, for example) draws air flow from the air outlet 14 of the air flow chamber 10 and circulates this air flow to the air inlet 12 of the air flow chamber 10. The air flow generator 50 provides air flow to the air flow chamber 10 at a rate of at least 10 meters/sec, or at least 15 meters/sec, or at least 20 meters/sec and the air flow chamber is configured to provide air flow in the product zone having a Reynolds number of 2000 or less, or 1000 or less. The air flow generator 50 can also provide the air pressure $P_C$ in the product zone 17 that is equal to or less than ambient pressure $P_A$ outside the air flow chamber 10, since the suction of the air flow generator 50 is in fluid connection with the product zone 17 of the air flow chamber 10. In some embodiments this system approximates a wind tunnel system and can include elements useful in wind tunnels such as an air diffuser or louvers or vanes. An air diffuser can form a "honeycomb" grid section to assist in creating the laminar air flow.

A heating element 60 can be along this air flow path to increase the temperature of the air flow. In many embodiments the air flow temperature is increased to at least 100 degrees centigrade, or at least 120 degrees centigrade, or at least 150 degrees centigrade. The heating element 60 can be placed in any location along the air flow path.

An oil recovery unit 40 can be along this air flow path to remove and collect oil 44 entrained in the air flow. The oil recovery unit 40 can be placed in any location along the air flow path. Preferably the oil recovery unit 40 is located just downstream of the air outlet 14 of the air flow chamber 10. In some embodiments, the oil recovery unit 40 can be an oil coalescing unit or include filter media to separate the oil particles from the air flow.

The system includes an air flow chamber 10 having a food product conveyor 20 for moving food product through the air flow chamber 10 in a direction 70 orthogonal to an air flow direction. Oil laden air exits the air flow chamber 10 at the air outlet 14 and can be processed by the oil recovery unit 40. Oil cleaned air flow 42 enters the air flow generator 50 and is recirculated as blower outlet air 52. The blower outlet air 52 can pass through the heating element 60 and exit as heated air 62. The heated air 62 enters the air inlet 12 of the air flow chamber 10.

Figure 4:
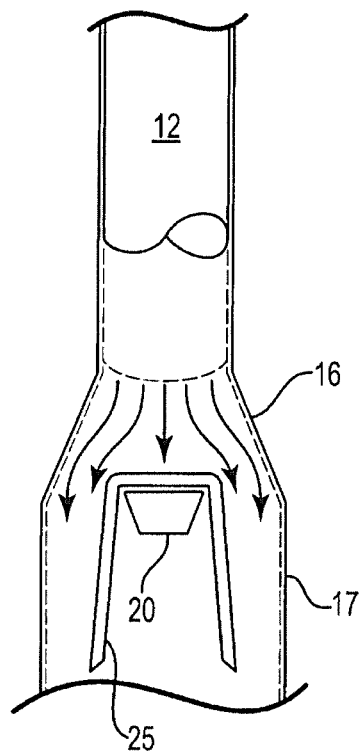
FIG. 4 is a schematic cross-sectional diagram of an illustrative air flow chamber having a food product within the air flow.
Figure 5:
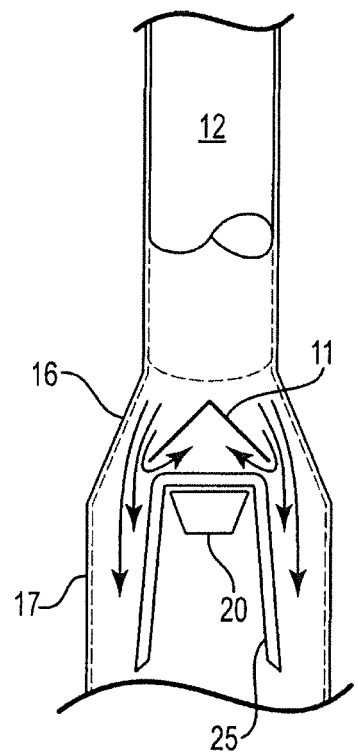
FIG. 5 is a schematic cross-sectional diagram of an illustrative air flow chamber having a food product and an air flow diverter element within the air flow.
Figure 6:
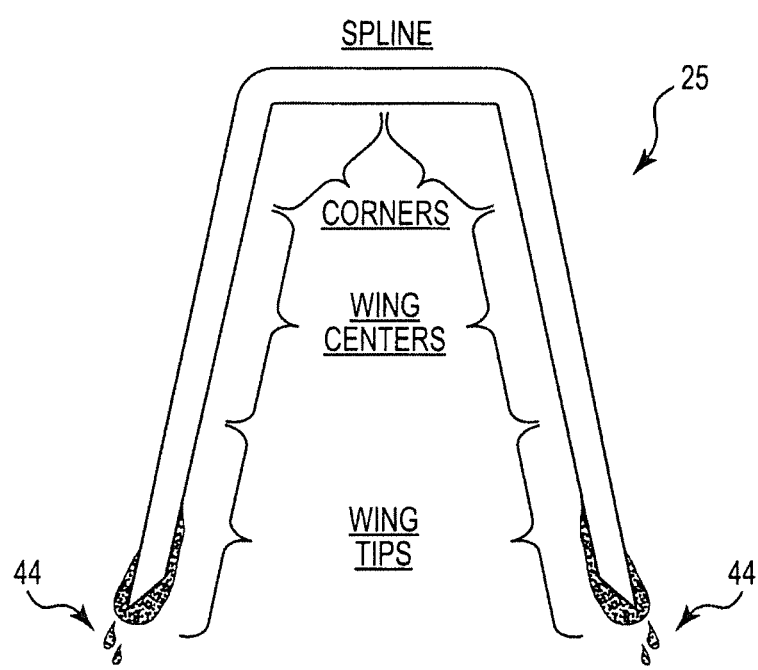
FIG. 6 is a cross-section of an illustrative taco shell food product with residue oil dripping off the wing tips of the taco shell.

FIG. 4 is a schematic cross-sectional diagram of an illustrative air flow chamber having a food product 25 within the air flow. FIG. 5 is a schematic cross-sectional diagram of an illustrative air flow chamber having a food product 25 and an air flow diverter element 11 within the air flow. FIG. 6 is an illustrative taco shell food product 25 with residue oil dripping off the wing tips of the taco shell.

The air flow diverter element 11 diverts air flow from a portion of the food surface. The air flow diverter element 11 can preferentially divert air from a portion of the food surface. This can provide for more oil removal from chosen portions of the food surface. The illustrative air flow diverter element 11 is located upstream from the food product 25.

The illustrative food product 25 in FIG. 4-6 is a taco shell. The taco shell 25 includes a spline connecting two wing portions at corners. The conveyor 20 can hold the taco shell 25 along an inner portion of the spline of the taco shell 25. Air flow travels from the air inlet 12 to the inlet air expansion zone 16 and onto the outer surface of the taco shell 25 in the product zone 17. The illustrated taco shell configuration has a flat spline, it is understood that this is for illustrative purposes and the apparatus and method described herein can be utilized on any taco shell having any configuration such as a flat, rounded or V-shaped configuration.

While a taco shell is specifically illustrated, it is understood that the food product can be any food product where oil needs to be removed from a surface of the food product. Preferably the food product is a fried food product that was just fried or cooked in hot oil. These food products include snack products, or pizza or pizza roll products, or french fry products, or potato chip products.

FIG. 4 illustrates air flow around the taco shell 25 without an air flow diverter element. In this arrangement, it is possible to remove more oil from the spline and corners of the taco shell 25 than is removed from the wing tips of the taco shell 25. This can result in the spline and corners being more brittle than the wing tips of the taco shell 25. This may not be desirable.

FIG. 5 illustrates air flow around the taco shell 25 with an air flow diverter element 11. The air flow diverter element 11 diverts air flow preferentially from the spline and corners of the from the taco shell 25. In this arrangement, it is possible to remove more oil from the wings and wing tips of the taco shell 25 than is removed from the spline and corners of the taco shell 25. This can result in the spline and corners being less brittle than the wing tips of the taco shell 25. This may be desirable.

Thus, embodiments of OIL REMOVAL FROM FOOD SURFACE are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A method of removing oil from a food surface comprising:
   placing a food article within an air flow chamber, the air flow chamber having an inlet air expansion zone and an opposing outlet air contraction zone and the food article is within a product zone separating the inlet air expansion zone and the opposing outlet air contraction zone;
   flowing air from the inlet air expansion zone to the opposing outlet air contraction zone to form an air flow, the product zone having a pressure being less than or equal to ambient pressure outside the air flow chamber, wherein the air expands in the inlet air expansion zone as it flows to the product zone and wherein the air contracts in the outlet air contraction zone as it flows from the product zone; and
   removing oil from the food surface with the air flow.

2. The method according to claim 1, wherein the air flow is laminar.

3. The method according to claim 1, wherein the placing step comprises conveying the food article through the air flow chamber in a direction orthogonal to the air flow.

4. The method according to claim 3, wherein the air flow chamber comprises a conveyor inlet opening and a conveyor outlet opening.

5. The method according to claim 1, wherein the placing step comprises vibrating the food article.

6. The method according to claim 1, wherein the food article is a taco shell.

7. The method according to claim 1, wherein the air flow is at least 10 meters/sec.

8. The method according to claim 7, wherein the air flow is at least 100 degrees centigrade.

9. The method according to claim 1, wherein the air flow is recycled in a closed loop system.

10. The method according to claim 1, wherein the flowing step comprises diverting the air flow from a portion of the food surface with an air flow diverter element.

11. A method of removing oil from a food surface comprising:
   placing a food article within an air flow chamber, the air flow chamber having an inlet air expansion zone and an opposing outlet air contraction zone and the food article is within a product zone separating the inlet air expansion zone and the opposing outlet air contraction zone;
   flowing air from the inlet air expansion zone to the opposing outlet air contraction zone to form an air flow, the product zone having a pressure being less than or equal to ambient pressure outside the air flow chamber; and
   removing oil from the food surface with the air flow,
   wherein the flowing step comprises diverting the air flow from a portion of the food surface with an air flow diverter and,
   wherein the food surface comprises a taco shell having a central spline portion and opposing wing portions extending from the central spline portion, and the air flow diverter diverts air flow away from the central spline.

12. The method according to claim 1, wherein the air flow in the product zone has a Reynolds number of 1000 or less.

13. The method according to claim 1, further comprising removing oil from the air flow downstream from the product zone.

14. An apparatus for removing oil from a food surface comprising:
   an air flow chamber, the air flow chamber having an inlet air expansion zone and an opposing outlet air contraction zone and a product zone separating the inlet air expansion zone and the opposing outlet air contraction zone, wherein the inlet air expansion zone, which is bounded on all sides by ducting material, directs and expands the air flow to the product zone, while the outlet air contraction zone, which is also bounded on all sides by ducting material, directs and contracts the air flow from the product zone, and the air flow chamber is configured to provide laminar air flow within the product zone; and
   a food product conveyor for moving food product through the product zone in a direction orthogonal to an air flow direction.

15. The apparatus according to claim 14, further comprising an air flow diverter element disposed upstream of the food product conveyor, wherein the air flow diverter element diverts air flow around a portion of a food surface being conveyed on the food product conveyor.

16. The apparatus according to claim 14, wherein the outlet air contraction zone is fluidly connected to the inlet air expansion zone and forming a closed loop air flow system.

17. The apparatus according to claim 14, further comprising an oil recovery unit downstream of the outlet air contraction zone, the oil recovery unit removing oil from the air flow.

18. The apparatus according to claim 14, wherein the air pressure in the product zone is equal to or less than ambient pressure outside the air flow chamber.

19. The apparatus according to claim 14, wherein the product zone is defined by opposing side walls and opposing open ends that are perpendicular to the opposing side walls, the opposing open ends include a conveyor inlet opening and a conveyor outlet opening.

20. The apparatus according to claim 14, further comprising an air flow generator in fluid connection with the air flow chamber, the air flow generator provides air flow to the air flow chamber at a rate of at least 10 meters/sec and the air flow chamber is configured to provide air flow in the product zone having a Reynolds number of 2000 or less.

* * * * *